United States Patent [19]

Stole

[11] Patent Number: 5,330,289
[45] Date of Patent: Jul. 19, 1994

[54] SERPENT SEDIMENT-SLUICING SYSTEM

[76] Inventor: Haakon Stole, Fagerliveien 20 D, 7018 Trondheim, Norway

[21] Appl. No.: 938,246
[22] PCT Filed: Apr. 27, 1990
[86] PCT No.: PCT/NO90/00075
   § 371 Date: Dec. 23, 1992
   § 102(e) Date: Dec. 23, 1992
[87] PCT Pub. No.: WO91/16981
   PCT Pub. Date: Nov. 14, 1991
[51] Int. Cl.⁵ ............................................. E02B 3/02
[52] U.S. Cl. .................................... 405/74; 405/87
[58] Field of Search ............... 405/52, 73, 74, 80, 405/87, 90, 91

[56] References Cited

U.S. PATENT DOCUMENTS

| | | | |
|---|---|---|---|
| 510,713 | 12/1893 | Scott | 405/73 X |
| 1,351,979 | 9/1920 | Valentin | 405/74 |
| 1,388,040 | 8/1921 | Hood | 405/74 |
| 4,189,253 | 2/1980 | Pekor | 405/74 |

FOREIGN PATENT DOCUMENTS 272110  11/1990  Japan ..................... 405/74

Primary Examiner—David H. Corbin
Attorney, Agent, or Firm—Dennison, Meserole, Pollack & Scheiner

[57] ABSTRACT

A method and apparatus for removing sedimented particles from a fluid stream in a settlement basin. In the bottom of the basis there is a sluice which may include a sluice gate. The basin includes a longitudinal, flexible pipe unit which is shaped such that it can seal the edges of the sluice. The pipe unit can move up and down within the basin by filling the pipe with a fluid, i.e. water or air. Depending on the initial position of the pipe, upward or downward movement causes the pipe to seal against the edges of the sluice. By adjusting the amount of water and air in the pipe, it is possible to adjust the extent to which the sluice is sealed.

9 Claims, 4 Drawing Sheets

SERPENT SEDIMENT-SLUICING SYSTEM

BACKGROUND OF THE INVENTION

The invention concerns a method and means of removing sediments (particles) from a fluid after deposition.

The invention can be used for the extraction of sediments from rivers carrying sediments in suspension, so as to control the processes on the river bed or utilize such sediments for a variety of purposes including: sand and gravel extraction, earth filling, mineral exploration, or the measurement of sediment-transport in rivers.

A specific application of the invention is as a water outlet in river development systems and associated constructions such as hydropower stations, irrigation systems and normal water supply where there is a need to remove sediments in the river water before it is led into the pipelines, tunnels or channels that connect the river to the end user.

Known means of removing sediments from systems which are in continuous operation involve flushing, suction or the mechanical scraping of sediments. Flushing (continuous or periodic) is dependent on obtaining sufficient velocity in the fluid carrying the particles to force the particles out of the fluid stream by means of a flushing device. Despite the substantial fluid consumption, the method produces a correspondingly low concentration of sediments in the flushed outflow. If it is required to separate particles of different sizes, their physical characterists will lead to deposition in different geographical areas of the sedimentation basin. This involves a further increase in the fluid requirements of such flushing systems.

Systems involving the suction of deposited sediments will often prove expensive in operation both because of the machinery involved and the cost of its maintenance.

The removal of deposited sediments from settlement basins can either be done by closing and draining the basin, or while the system is operational.

After drainage, the sediments can either be removed by flushing or mechanical means whilst the rest of the system has been made inoperative. In practical terms this is an extremely costly and inappropriate method, where the operating losses will be enormous.

PURPOSE OF THE INVENTION

The main summary of the invention is to find a method and a means of removing sediments that does not involve halting the fluid flow and only a restricted amount of fluid is required to remove the sediments.

Another consideration is that the method is to be straightforward to use. Consequently, the following demands have been stipulated:
- The operator is not required to make any physical encroachment in the settlement basin
- Unskilled operators (such as dam superintendents) should be able to understand the method and thereby be in a position to monitor it
- No mechanical equipment should be required to operate the system
- If the system is operated incorrectly, it should nevertheless be possible to remove the sediments by repeating the process, thus avoiding the necessity of draining the basin.

The invention can briefly be described as follows. A sluice is connected to a sedimentation basin by a longitudinal opening.

Flushing causes a difference in pressure between the settlement basin and the outlet of the sluice. The opening can be successively opened and closed throughout the length of the settlement basin. Thus the entire flushing capacity of the sluice can be moved along the bottom of the settlement basin and concentrated on the open part of the sluice just upstream of the closed part of the sluice. The settlement basin has a profile that helps sediments slide and be sucked into the sluice. The angle of the walls must be adjusted to the type of particle that is to be separated. The opening and closing velocity can be adjusted in each basin to achieve an optimal technical/economic solution. This is done by natching the following parameters: fluid flow in the sluice, the amount and nature of the sediments, the cleansing required by the fluid and the shape of the basin (including the fluid velocity in the settlement basin).

A flexible float unit such as a flexible pipe could be used to open and close the opening between the settlement basin and the sluice. The float unit should be designed so that it can both open and close the space between the basin and the sluice, and be strong enough to take the force of the underpressure in the sluice and also the sediment wear on its outer sides. The float unit can be lowered or released by filling or extracting gas and/or a liquid from it. When full of liquid the float will be heavier than the fluid in the settlement basin and will sink down and close the sluice. When the liquid is removed (or the float is filled with gas) the float becomes lighter than the fluid in the settlement basin, and buoyancy will cause it to rise and gradually open the space between the settlement basin and the sluice, thereby transferring the point of suction along the bottom of the settlement basin.

BRIEF DESCRIPTION OF THE DRAWINGS

The invention may be better understood by reference to the following drawings, in which.

DESCRIPTION OF THE PREFERRED EMBODIMENTS

Figure 1:
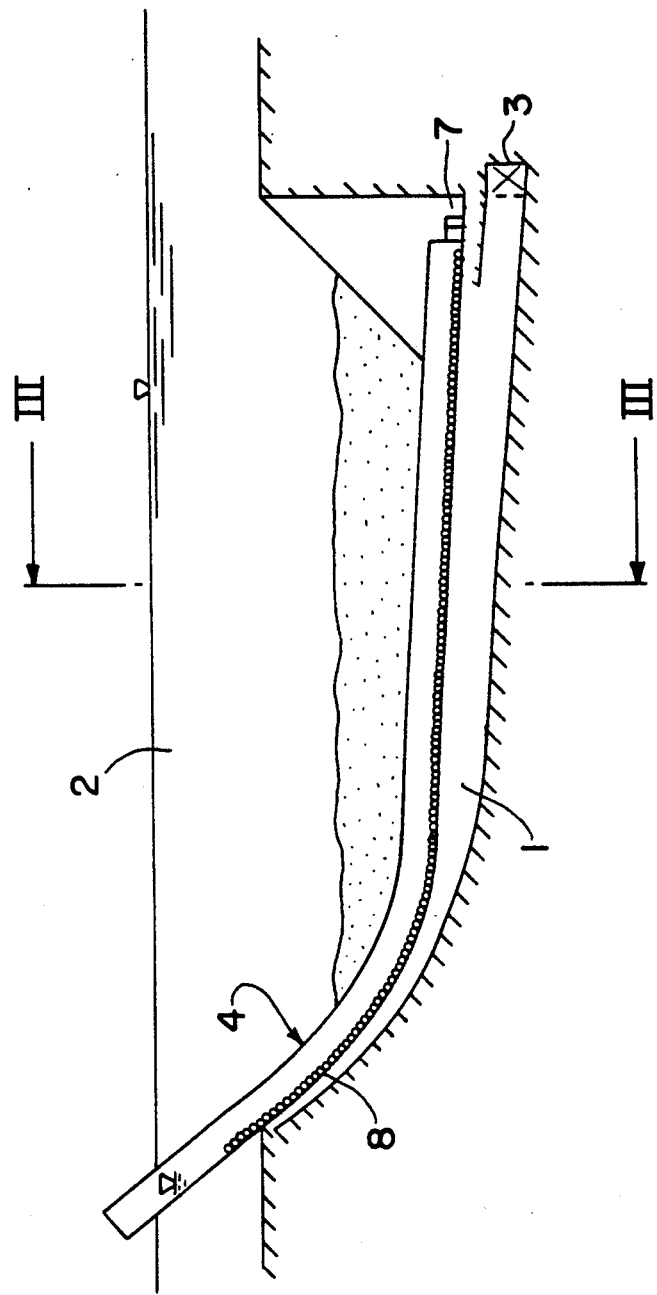
FIG. 1 shows a longitudinal section of a sluice designed in accordance with the invention, located on the bottom of the settlement basin.

A sluice 1 is situated in the bottom of a settlement basin 2 for sediments as illustrated in FIG. 1. The sluice 1 has an outlet 3 with a potential energy level which is sufficiently lower than the energy level in the settlement basin 2 to generate a fluid stream which transports the deposited sediments from the settlement basin 2 to the outlet 3 of the sluice 1. A sluice gate 6 has been located between the basin and the outlet of the sluice, this has been done for practical purposes (such as maintenance on the float unit), despite the fact that the float unit can also act as means of closing the sluice. Above the part of the sluice found in the settlement basin there is a flexible, longitudinal float unit 4 (a pipe, for example). This can be made lighter or heavier than the fluid in the settlement basin by respectively emptying or filling it with a fluid or gas through the supply tube 7. The float unit 4 can also have sinking arrangement 8 to make the float unit 4 heavy enough to sink when full of liquid. The float unit 4 will block the flow between the sluice 1 and the settlement basin 2 when the said unit lies in its lowest submerged position. This results in a pressure difference between the sluice 1 and the basin 2 above. The section of the float unit 1 that is not filled with a liquid will be buoyant enough to rise towards the top of the settlement basin 2. Fluid and sediments are sucked into the sluice 1 around the float unit 4 at the position where the float unit 4 is not sealing the sluice. Successively emptying/filling the float unit 4 results in a snake-like movement which moves the sluice s 1 point of attack (suction point) along the sluice channel in the bottom of the settlement basin 2.

Figure 2:
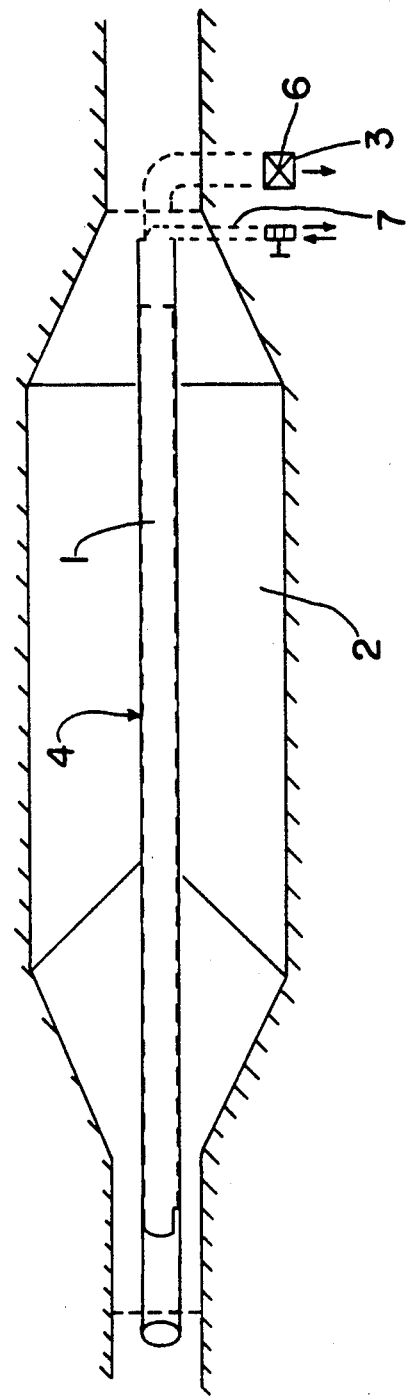
FIG. 2 shows a plan perspective of the sluice in FIG. 1.

FIG. 2 shows a plan perspective of the sluice in FIG. 1. Here, the sluice gate 6 is located before the outlet 3, this should be adjusted to the overall shape of the basin in each case.

Figure 3:
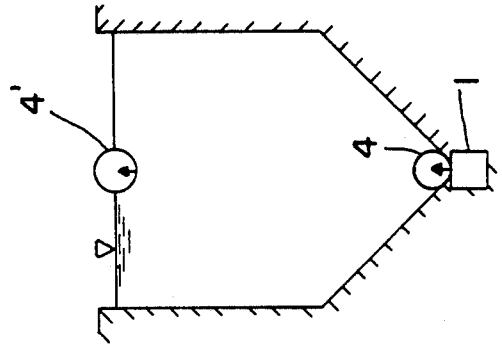
FIG. 3 shows a cross-section of the sluice in FIG. 1 along line III—III.

FIG. 3 shows how the float unit 4 is placed in a submerged position in the basin 2. The position of the float unit 4 is also shown, this is indicated as 4. The float unit will be in this position unless some device is used which holds the pipe at a certain depth in the settlement basin 2.

Figure 4:
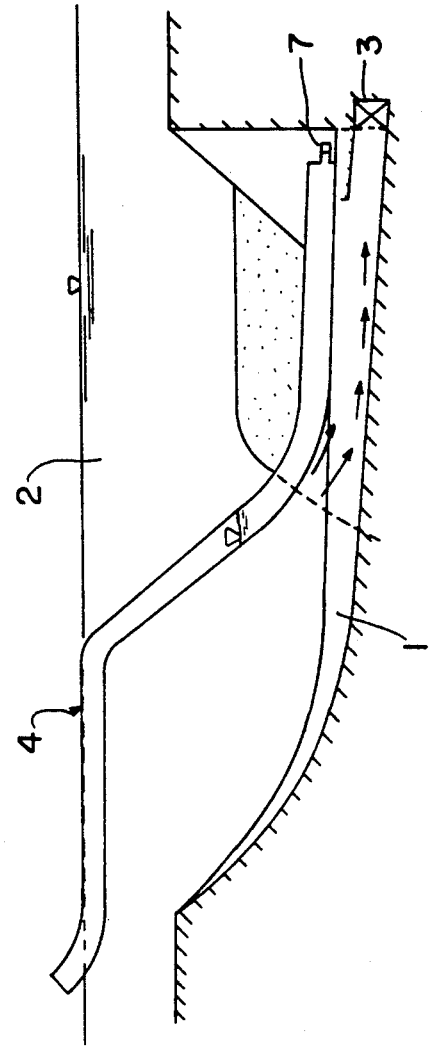
FIG. 4 shows the sluice in FIG. 1, when the deposited sediments are above the float unit.

FIG. 4 shows the means by which sediments above the float u: t 4 are led into the sluice 1, here the sediments next to the sluice are sucked into it. The overlying sediments are fed into the sluice as a result of the suction and sliding movement in the sediment mass. As the float unit rises, the point of suction is moved along the sluice 1 in the manner described above.

Figure 5:
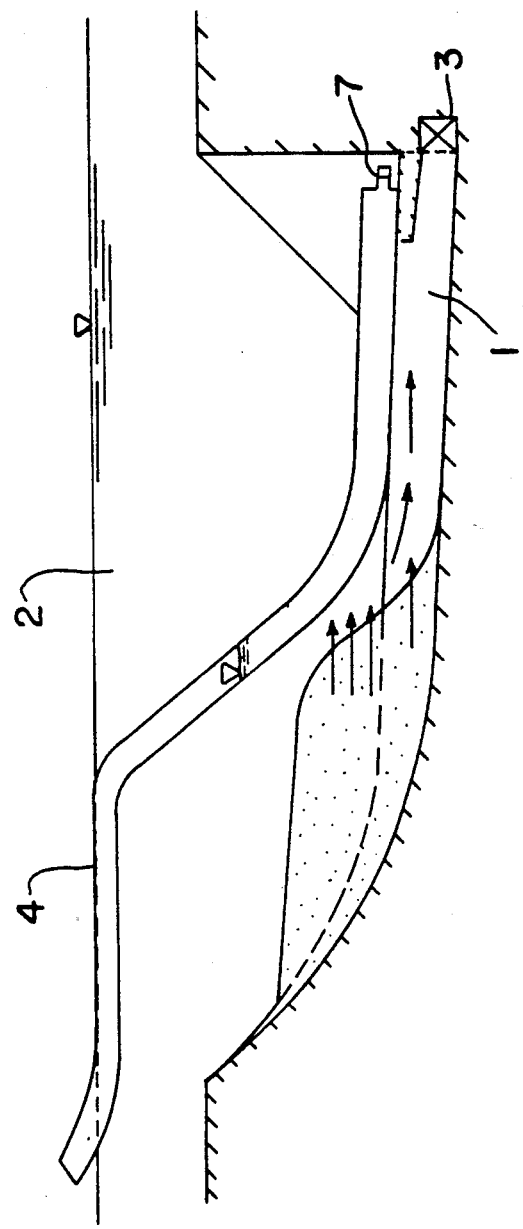
FIG. 5 shows the sluice in FIG. 1, when the deposited sediments are below the float unit.

FIG. 5 illustrates the situation when the sediments under the float unit 4 are led into the sluice 1. Here, the float is filled with liquid and sinks towards the bottom of the basin 2, as a result there is erosion in the underlying sediment mass.

The removal of the sediments is independent of the direction of current or shape of the settlement basin. As an alternative the longitudinal float unit can be located inside the sluice with buoyancy and support upwards on the sides of the upper part of the sluice. Emptying can be done by sinking the float unit by removing the gas and/or supplying liquid.

There are a number of advantages of removing deposited sediments by the above method:
  continual operation of the sedimentation unit,
  minimal use of liquid when removing sediments,
  simple means of operating the unit,
  possibility of adjusting the unit to the characteristics of the sediment in the inflowing fluid and any requirements concerning sediment content after it has passed the sediment trap,
  possible to physically adjust the unit to surrounding structures, and thereby reduce the construction costs,
  separation can be done in systems with open and closed cross-sections (such as a pressure tunnel).

The invention can be used in all types of fluid treatments where the aim is to separate the particles from a fluid flow by means of deposition, this includes all types of cleansing systems.

The invention can also be used in river development management. Here the invention can remove sediments in the reservoir to maintain both the hydropower potential of the reservoir and the natural river transport of sediments past the power station.

The invention permits a more flexible design of the vessel the fluid flows along during separation, and the sediment characteristics (particle size, shape, specific gravity) can be varied widely. Sediments can either be removed periodically or continually.

I claim:

1. A method for removing sedimented particles from a settlement basis comprising a bottom portion having a longitudinally extending sluice therein having longitudinal side edges, comprising providing a flexible, longitudinal tube means in said basin or sluice, changing the buoyancy of said tube means by introduction of a fluid to or removal of a fluid from said tube means, thereby causing said tube means to seal at least a portion of said side edges, and changing the buoyancy of said tube means by introduction of a fluid to or removal of a fluid from said tube means, thereby causing the tube means to unseal at least a portion of said side edges.

2. Method according to claim 1, wherein the fluid is water or air.

3. In a settlement basin comprising a bottom portion having a longitudinally extending sluice therein having longitudinal side edges, an apparatus for sealing the sluice from the settlement basin comprising a longitudinally extending flexible tube means of a size sufficient to seal the side edges, and means for changing the buoyancy of said tube means causing vertical movement of at least a portion of said tube means, the vertical movement causing the tube means to seal or unseal at least a portion of the side edges.

4. Apparatus according to claim 3, wherein said means for changing the buoyancy comprises means for introduction of a fluid into said tube means and means for removal of a fluid from said tube means.

5. Apparatus according to claim 3, wherein said tube means comprises a sinking means to decrease the buoyancy thereof.

6. Apparatus according to claim 5, wherein said sinking means comprises a chain.

7. Apparatus according to claim 3, wherein said tube means is disposed in the basin above the sluice.

8. Apparatus according to claim 3, wherein said tube means is disposed in the sluice.

9. Apparatus according to claim 3, wherein the sluice includes a gate at one end thereof.

* * * * *